United States Patent [19]
Books et al.

[11] Patent Number: 5,639,799
[45] Date of Patent: Jun. 17, 1997

[54] HEAT STABILIZED FLAME RETARDANT STYRENIC POLYMER FOAM COMPOSITIONS

[75] Inventors: Jeffrey T. Books; Susan D. Landry, both of Baton Rouge, La.

[73] Assignee: Albemarle Corporation, Richmond, Va.

[21] Appl. No.: 731,422

[22] Filed: Oct. 15, 1996

[51] Int. Cl.[6] ................................................ C08J 9/08
[52] U.S. Cl. ........................... 521/79; 521/91; 521/98; 521/146; 521/93; 521/81
[58] Field of Search ................. 521/79, 98, 91, 521/146, 81

[56] References Cited

U.S. PATENT DOCUMENTS 3,428,595  2/1969  Tsukada et al. ................... 260/41
4,000,100  12/1976  Baldyga ............................ 260/23 X
4,250,081  2/1981  Bode et al. ....................... 260/42.46
4,814,364  3/1989  Yoshizaki et al. ................ 523/100

FOREIGN PATENT DOCUMENTS 115948   6/1986   Japan .
199654   9/1987   Japan .
1403808  8/1975   United Kingdom .

*Primary Examiner*—Morton Foelak
*Attorney, Agent, or Firm*—E. E. Spielman, Jr.

[57] ABSTRACT

Low density, heat stabilized, flame retardant styrenic polymer foam compositions include a halogen-based flame retardant such as hexabromocyclododecane and zeolite A heat stabilizer.

11 Claims, No Drawings

HEAT STABILIZED FLAME RETARDANT STYRENIC POLYMER FOAM COMPOSITIONS

This invention relates generally to heat stabilized, flame retardant styrenic polymers and more particularly to styrenic polymer foam compositions which include halogen-based flame retardants and zeolite A heat stabilizers.

Halogen containing materials, for example, cycloaliphatic organic compounds such as hexabromocyclododecane (HBCD) are widely used in styrene-based polymer compositions to impart flame retardant properties to the compositions. However, their presence in the styrenic polymer-based compositions has the drawback of lowering thermal stability. This can cause serious color and/or viscosity problems when the compositions are exposed to high processing temperatures. In order to improve their thermal stability, it is customary to add a stabilizing agent, such as hydrotalcite, tetrasodium pyrophosphate or dibutyl tin maleate.

However, it has been found that when forming styrenic polymer foams, the flame retardants with normal heat stabilizers tend to increase foam density. It has now been found that when zeolite A is added to flame retarded styrenic polymer compositions they are not only exceptionally heat stable even when subjected to multiple heatings, but the zeolite A has less effect on the foam density.

In accordance with this invention, there is provided a styrenic polymer foam formed from the components which comprise:

(a) a styrenic polymer, (b) a flame retardant amount of a halogen-based flame retardant, (c) a heat stabilizing amount of zeolite A, and (d) a blowing agent.

Also provided is a process for manufacturing an extruded, styrenic polymer foam comprising the steps of (i) expressing a heat-plastified styrenic polymer gel composition from a die so that the expressed gel expands into cellular foam, said composition including, in addition to the polymer, a blowing agent, a halogen-based flame retardant material and a heat stabilizing amount of zeolite A, and (ii) cooling the expanded cellular polymer foam to a temperature at which said foam is self-supporting.

Styrenic polymers are usually classified as general-purpose polystyrene (GPPS) or as impact-modified polystyrene (IPS). GPPS is a high molecular weight, clear polymer which is hard, rigid and free of odor and taste. It finds use in producing moldings and extrusions, including foams and films. IPS is a rubber-modified polystyrene which is characterized by its toughness and resistance to abuse. The rubber, such as a butadiene rubber, is dispersed in the polystyrene matrix in the form of discrete particles. IPS is not clear, but rather is either translucent or opaque depending upon the amount of rubber used. The art recognizes two types of IPS, i.e., medium-impact polystyrene (MIPS) and high-impact polystyrene (HIPS), the former containing less rubber than the latter. HIPS can be generally characterized as having about an 8 to about 18 wt % rubber content. In some instances, mixtures of IPS and GPPS are used to achieve certain blends of properties.

For the purposes of this invention, the styrenic polymer can be GPPS, or a mixture of GPPS and IPS. The GPPS and IPS may be homopolymers, copolymers or block polymers and are formed from such vinyl aromatic monomers as styrene, ring-substituted methyl or polymethylstyrenes, ring-substituted ethyl or polyethylstyrenes, ring-substituted propyl or polypropylstyrenes, ring-substituted butyl or polybutyl styrenes, ring-substituted mixed polyalkylstyrenes wherein the alkyl groups differ from each other, alpha-methylstyrene, ring-substituted methyl- or polymethyl-alpha-methylstyrenes, propyl- or polypropyl-alpha-methylstyrenes, butyl- or polybutyl-alpha-methylstyrenes, ring-substituted mixed polyalkyl-alpha-methylstyrenes wherein the alkyl groups differ from each other, ring-substituted alkyl- or polyalkylchlorostyrenes in which the alkyl group(s) contain(s) from one to four carbon atoms, and similar polymerizable styrenic monomers—i.e., styrenic compounds capable of being polymerized by means of peroxide or like catalysts into thermoplastic resins. Homopolymers and copolymers of simple styrenic monomers (e.g., styrene, p-methyl-styrene, 2,4-dimethylstyrene, alpha-methylstyrene, p-chloro-styrene, etc.) are preferred from the standpoints of cost and availability.

The halogen-based flame retardants used in this invention may be any such flame retardants that are commonly used in this field and which are subject to heat stability problems such as aliphatic, cycloaliphatic, and mixed-aromatic halogen compounds in which the aliphatic groups contain halogen. Examples that may be cited include tetrabromoethane, tetrabromobutane, hexabromocyclododecane, acetylene tetrabromide, pentabromochlorocyclohexane, ethylene bis (dibromobomane dicarboximide) (BN 451), dibromoethyldibromocyclohexane (BCL 462), tetrabromocyclooctane (BC-48), melamine hydrobromide, tris(2,3-dibromopropyl) isocyanurate, tetrabromobisphenol A bis-(2,3-dibromopropyl ether), 2,3-dibromopropylpentabromophenyl ether, tetrabromophthalic anhydride and esters thereof, including RB-79 and PHT-4 diol, chlorinated polyethylenes, chlorinated paraffins, and chlorendic anhydride and derivatives thereof and the like. There is no particular limit on the amount in which these halogen-based flame retardants are added, it being suitable to vary the amount as appropriate according to the desired degree of flame retardation. It is generally preferable to use 0.5–35 parts by weight, per 100 parts by weight of styrene-based resin, of one of these flame retardants alone or of two or more together. A preferred flame retardant is a hexabromocyclododecane material. This material is a mixture of isomers.

Both the low-melt and high-melt hexabromocyclododecane products having individual melting point ranges within the general range of about 170° C.–200° C. can be used. A most highly preferred product is HBCD-LM flame retardant available from Albemarle Corporation. This HBCD material has a melting point range of 178° C.–188° C. and an minimum melt point of 175° C.

The amount of flame retardant used is that amount which will render the foams flame retardant. For the purposes of this invention, the term "flame retardant" is to mean that the formulation, when tested in a Steiner Tunnel in accordance with UL 723 and ASTM E-84, obtains a Standard Building Code rating of at least C (flame spread index of 76–200, smoke density≦450) and preferably a rating of A or B (A=flame spread index of 0–25, B=flame spread index of 26–75). For HBCD and other cycloaliphatic halogen-based flame retardants, from about 0.5 to 8 wt % is generally used based upon the total weight of the formulation. Highest ratings can be obtained using from about 1.0 wt % HBCD at a foam thickness of 0.5" up to about 3.0 wt % at a foam thickness of 2.0".

The zeolite A used in the practice of this invention can be represented by the generalized formula for zeolite, $M_{2/n}O \cdot Al_2O_3 \cdot ySiO_2 \cdot wH_2O$, wherein M is a group IA or IIA element, such as sodium, potassium, magnesium and calcium. For a sodium zeolite, the formula is $Na_2.OAl_2O_3.xSiO_2.yH_2O$. The value of x normally falls within the range of 1.85±0.5. The value for y can also be variant and can be any value up to about 6. On average, the value of y will be about 5.1. For a sodium zeolite A the formula can be written as $1.0\pm0.2Na_2O.Al_2O_3.1.85\pm0.5SiO2.yH_2O$, wherein the value of y can be up to about 6. An ideal zeolite A has the following formula, $(NaAlSiO_4)_{12}.27H_2O$. Zeolite A is commercially available and can be purchased from Albemarle Corporation under the trademark EZA.

The amount of zeolite A used is that amount which effects thermal stabilization of the formulation. Generally, for most formulations of the invention, the amount of zeolite A used will be within the range of from about 0.1 to about 5 wt % based upon the total weight of the formulation. A preferred amount is within the range of from about 0.6 to about 1.5 wt %.

In addition to the polystyrenic polymer, halogen-based flame retardant, and zeolite A, there can be present in the formulation conventional additives in their conventional amounts. Exemplary of such additives are: fillers, pigments, dyes, impact modifiers, UV stabilizers, antioxidants, processing aids, nucleating agents, lubricants and the like.

Transition metal-containing compounds, for example, lubricants, nucleating agents, dyes and pigments are commonly used in the styrenic polymer compositions in amounts of from about 0.005 to 1.0 weight percent or more of the composition. Non-limiting examples of these compounds include lubricants such as zinc stearate and other Zn, Cu, Fe, etc., salts of fatty acids such as stearic, tallow, coco fatty acids and the dimer of oleic acid. Aryl carboxylate and sulfonate salts, i.e., benzoate or terephthalate salts are used as nucleators. These compounds tend to cause serious degradation problems upon the achievement of high temperatures and/or undergoing a heat history (masterbatch heat experience+processing heat experience or other multiple heating processes such as scrap recycle). This can occur not only when the transition metal compound is present in functional (i.e., lubricating, nucleating, or colorant) amounts, where the transition metal is present in amounts of from about 100 to 1,000 ppm or more by weight of polymer composition, but even when the transition metal is only incidentally present in amounts of less than 100 ppm (as little as 10 ppm) by weight of the composition as a result, for example, of incorporating polymer scrap into the composition. The presence of the zeolite A stabilizer renders the compositions exceptionally heat stable when they are subjected to such multiple heatings.

All of the constituents are blended in any conventional manner and can be blended in any order. For example, the constituents can first be dry mixed and then fed to a Banbury mixer or twin screw extruder to obtain a blended material for feed, for example, to an injection molding apparatus. Blending temperatures will be within the range of from about 180° to 200° C.

A convenient way to add the flame retardant and stabilizer to the styrenic polymer is as a masterbatch, which is a concentrated, heat blended or extruded mixture of the various additives in the polymer. The concentration of additives usually ranges from about 10 to 90 percent by weight of the total weight of masterbatch composition, with the balance being polymer. The masterbatch is then added to the bulk of the styrenic polymer material, which may already contain other additives such as a zinc stearate lubricant. The masterbatch is added in proportions to give the desired concentration of additives in the final blended product.

Styrenic foam materials, for example, rods or rectangular boards, are formed, as is known, by mixing the additives, either individually or as a masterbatch, with the polymer and then feeding the mixture to an extruder along with a foaming agent and, optionally, a nucleating agent, such as talc or commercially available carbonate-based materials, for example, the material sold under the trademark, Safoam—FP.

Any of a wide variety of known foaming agents or blowing agents can be used in producing the expanded or foamed flame resistant polymers of this invention. U.S. Pat. No. 3,960,792 gives a listing of some suitable materials. Generally speaking, volatile carbon-containing chemical substances are the most widely used for this purpose. They include, for example, such materials as aliphatic hydrocarbons including ethane, ethylene, propane, propylene, butane, butylene, isobutane, pentane, neopentane, isopentane, hexane, heptane and mixtures thereof; volatile halocarbons and/or halohydrocarbons, such as methyl chloride, chlorofluoromethane, bromochlorodifluoromethane, 1,1,1-trifluoroethane, 1,1,1,2-tetrafluoroethane, dichlorofluoromethane, dichlorodifluoromethane, chlorotrifluoromethane, trichlorofluoromethane, sym-tetrachlorodifluoroethane, 1,2,2-trichloro-1,1,2-trifluoroethane, sym-dichlorotetrafluoroethane; volatile tetraalkylsilanes, such as tetramethylsilane, ethyltrimethylsilane, isopropyltrimethylsilane, and n-propyltrimethylsilane; and mixtures of such material. One preferred fluorine-containing blowing agent is 1,1-difluoroethane also known as HFC-152a (FORMACEL Z-2, E. I. dupont de Nemours and Co.) because of its reported desirable ecological properties. Water-containing vegetable matter such as finely-divided corn cob can also be used as blowing agents. As described in U.S. Pat. No. 4,559,367, such vegetable matter can also serve as fillers. Use of carbon dioxide as a foaming agent, or at least a component of the blowing agent, is particularly preferred because of its innocuous nature vis-à-vis the environment and its low cost. Methods of using carbon dioxide as a blowing agent are described, for example, in U.S. Pat. No. 5,006,566 wherein the blowing agent is 80 to 100% by weight of carbon dioxide and from 0 to 20% by weight of one or more halohydrocarbons or hydrocarbons that are gaseous at room temperature, in U.S. Pat. Nos. 5,189,071 and 5,189,072 wherein a preferred blowing agent is carbon dioxide and 1-chloro-1,1-difluoroethane in weight ratios of 5/95 to 50/50, and in U.S. Pat. No. 5,380,767 wherein preferred blowing agents comprise combinations of water and carbon dioxide. Such materials can be utilized with appropriate flame retarded styrenic polymers of this invention. The entire teachings of the six U.S. patents whose numbers are recited in this paragraph are incorporated herein by reference.

The invention is further illustrated by, but is not intended to be limited to, the following examples.

Masterbatch Formation

EXAMPLE 1

A masterbatch of polystyrene (Styron® 685D GPPS, Dow Chemical Co.), which polystyrene contained about 136 ppm by weight of zinc as zinc stearate lubricant, was formed by blending, at a temperature of 150° C.–180° C., with mechanical mixing (100 rpm) in a Werner and Pfleiderer ZSK 30 twin-screw, co-rotating extruder, 77 parts by weight of polystyrene with 23 parts by weight of a mixture containing about 75 wt % HBCD-LM flame retardant and 25 wt % zeolite A. The polymer and flame retardant were gravimetrically fed from two separate feeders. Barrel zone temperatures were 150°, 160°, 170°, 175°, and 180° C. and the throughput was about 6 Kg/hour. The extruded strand was pelletized in line.

Comparative Example

A masterbatch was prepared using the same polystyrene and flame retardant, but with dibutyl tin maleate and 2,2'-oxamidobisethyl-3-(3,5-di-t-butyl-4-hydroxyphenyl) propionate (Naugard XL-1) as the stabilizers. The proportions were 76 wt % polystyrene and 24 wt % of a mixture containing 94 wt % HBCD-LM, 4 wt % dibutyl maleate, and 2 wt % Naugard XL-1 stabilizer.

EXAMPLES 2–5

A 1.25 inch segmented single screw extruder having a 40/1 length to diameter ratio and a rod die was used for foaming several mixtures of the masterbatch prepared in Example 1 with the same type of GPPS polystyrene used to make the masterbatch. The screw was designed to operate in three stages: a plasticization section, a gas injection section, and a metering and mixing section. Several samples were prepared to provide different concentrations of additives in the polymer. A small amount (0.05 wt % of composition) of Safoam—FP nucleating agent was also dry blended with the mixture. The mixtures were metered through a single screw feeder. $CO_2$ gas was used as a physical blowing agent for foaming the polystyrene blends. A description of the samples is given in Table 1 and the melt temperatures and $CO_2$ gas injection pressures are given in Table 2. The density of the foam products was also measured by the water displacement technique on samples of the product and the results are reported in Table 1. The lowest density product was obtained at a gas injection pressure of about 800–820 psi, a melt temperature of about 290° F.–300° F. and at melt pressures above 1400 psi. Temperatures at the different barrel zones were typically, in degrees F., 100–300–350–350–330–300–300–300–300–290 and 286–292 (melt). As a comparison, several samples of foam were made in the same way but using the masterbatch composition from the Comparative Example.

It was observed that the comparison samples appeared dark when extruded at a high temperature (400° F.). The use of a lower processing temperature was needed to reduce the color formation. In contrast, the foam samples prepared from the composition of the invention had much less color, even at high processing temperatures. It appears then, that even though the tin maleate and Naugard XL-1 stabilizers were adequate to reduce decomposition during masterbatch formation, significant decomposition occurred as a result of the second heating step when the masterbatch was used in the foaming process. The compositions of the invention were stable during the second heating step even at high processing temperatures, despite the presence of the zinc stearate lubricant which otherwise would accelerate the decomposition of the bromine containing styrenic polymer composition.

TABLE 1

| Example | Wt % HBCD-Zeolite | Wt % Br Theory | Fresh Foam Density g/cc | Aged Foam Density g/cc* |
|---|---|---|---|---|
| Control | 0.00 | 0.00 | 0.10 | 0.072 |
| 2A | 0.50 | 0.28 | 0.10 | 0.083 |
| 2B | 0.50 | 0.28 | 0.10 | 0.075 |
| 3 | 0.67 | 0.38 | 0.11 | 0.075 |
| 4 | 2.00 | 1.12 | 0.11 | 0.078 |

| Comparison | Wt % HBCD-Tin Maleate-Naugard XL-1 | | |
|---|---|---|---|
| 1 | 0.50 | 0.35 | 0.10 |
| 2 | 1.50 | 1.05 | 0.12 |
| 3 | 2.00 | 1.40 | 0.14 |

*Measurements made 8–10 weeks after manufacture of the samples

TABLE 2

| Example | Melt Temp (°F.) | $CO_2$ Injection Pressure (psi) |
|---|---|---|
| Control | 286 | 813 |
| 2A | 288 | 821 |
| 2B | 290 | 804 |
| 3 | 292 | 820 |
| 4 | 289 | 823 |
| Comparison | | |
| 1 | 290 | 816 |
| 2 | 287 | 813 |
| 3 | 286 | 824 |

As illustrated by the foam density data in Table 1, in addition to being more heat stable than the comparative materials, the combination of additives used in Example 4, at the higher bromine level required to obtain adequate flame retardancy, such as when forming 2 to 3 inch thick building insulation panels, also had less effect on the foam density. A significant increase in foam density was observed at a bromine level of 1.4% in Comparison 3 when using the tin maleate and Naugard XL-1 stabilizers. In contrast, the foam density of the samples made according to the invention remained about the same (within 10–15%) with increasing bromine levels. These samples also had improved color and thermal stability.

What is claimed is:

1. A process for manufacturing an extruded, styrenic polymer foam comprising the steps of:

(i) expressing a styrenic polymer gel composition fron a die so that the expressed gel expands into a cellular foam, said gel composition including, in addition to said styrenic polymer, a blowing agent, a flame retardant amount of a halogen-based flame retardant material, and a heat stabilizing amount of zeolite A, and (ii) cooling the expanded polymer foam to a temperature at which said foam is self-supporting.

2. The process according to claim 1 wherein said gel composition is made by adding a masterbatch to said styrenic polymer, said masterbatch having been prepared by heat blending said flame retardant material and said zeolite A with styrenic polymer.

3. The process according to claim 1 wherein said flame retardant material is a cycloaliphatic organic bromine compound.

4. The process according to claim 3 wherein said organic bromine compound is HBCD and said blowing agent is carbon dioxide.

5. The process according to claim 1 wherein said styrenic polymer gel composition includes a transition metal compound.

6. The process according to claim 5 wherein said compound is a transition metal salt of a fatty acid.

7. The process according to claim 6 wherein said compound is zinc stearate.

8. The process according to claim 2 wherein said masterbatch includes a transition metal salt of a fatty acid.

9. The process according to claim 8 wherein said salt is zinc stearate.

10. The process according to claim 1 wherein said polymer foam has a foam density which is substantially the same as a comparable polymer foam made under the same process conditions and containing the same components in the same proportions, except not including components b and c.

11. The process according to claim 10 wherein said foam density is no more than about 15% greater than the foam density of said comparable polymer foam.

* * * * *